United States Patent
Jang et al.

(10) Patent No.: US 7,855,747 B2
(45) Date of Patent: Dec. 21, 2010

(54) PORTABLE INTEGRATED DEVICE AND A METHOD OF CONTROLLING POWER THEREOF

(75) Inventors: In-ra Jang, Gwangmyeong-si (KR); Wan-je Park, Seoul (KR); Bo-eun Park, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 415 days.

(21) Appl. No.: 11/708,011

(22) Filed: Feb. 20, 2007

(65) Prior Publication Data

US 2008/0067045 A1 Mar. 20, 2008

(30) Foreign Application Priority Data

Sep. 14, 2006 (KR) .................. 10-2006-0089097

(51) Int. Cl.
*H04N 5/225* (2006.01)
*H04B 1/38* (2006.01)
*H04M 1/00* (2006.01)

(52) U.S. Cl. .................. 348/372; 455/572; 455/575.4
(58) Field of Classification Search ............. 348/372; 455/572–574, 575.1, 575.4
See application file for complete search history.

(56) References Cited

U.S. PATENT DOCUMENTS

| | | | | |
|---|---|---|---|---|
| 6,166,765 | A * | 12/2000 | Toyofuku | 348/220.1 |
| 6,750,916 | B1 * | 6/2004 | Isashi et al. | 348/376 |
| 7,079,185 | B2 * | 7/2006 | Koyama et al. | 348/335 |
| 7,271,845 | B2 * | 9/2007 | Aoyama et al. | 348/552 |
| 7,509,045 | B2 * | 3/2009 | Yamamoto | 396/287 |
| 2002/0159774 | A1 * | 10/2002 | Koyama et al. | 396/505 |
| 2003/0147637 | A1 * | 8/2003 | Sasagawa | 396/88 |
| 2005/0157178 | A1 * | 7/2005 | Miyata | 348/207.99 |

(Continued)

FOREIGN PATENT DOCUMENTS

CN 1461134 A 12/2003

(Continued)

OTHER PUBLICATIONS

Korean Office Action dated May 21, 2008 issued in KR 2006-0089097.

(Continued)

*Primary Examiner*—Lin Ye
*Assistant Examiner*—Amy Hsu
(74) *Attorney, Agent, or Firm*—Stanzione & Kim LLP

(57) ABSTRACT

A portable integrated device and a method of controlling power thereof. The method of controlling power to a digital integrated device which includes a first body and a second body slidingly attached to each other and a first mode and a second mode including sliding the first body relative to the second body from an open position to a closed position, turning off power of the digital integrated device in the first mode, and maintaining the power of the digital integrated device in the second mode. Accordingly, power control may be performed differently according to whether the sliding part is open or closed and whether the preset function mode of the portable integrated device is a camera mode or a non-camera mode, so that functions of the non-camera modes can be maintained even when the sliding part is closed.

33 Claims, 14 Drawing Sheets

U.S. PATENT DOCUMENTS

| | | | |
|---|---|---|---|
| 2005/0168615 A1* | 8/2005 | Sakimoto et al. | 348/335 |
| 2005/0212946 A1* | 9/2005 | Mikami | 348/335 |
| 2006/0001757 A1* | 1/2006 | Sawachi | 348/333.12 |
| 2006/0044447 A1* | 3/2006 | Takagi | 348/335 |
| 2006/0163095 A1* | 7/2006 | Yanagisawa et al. | 206/316.2 |
| 2006/0193627 A1* | 8/2006 | Nozaki | 396/430 |
| 2007/0009247 A1* | 1/2007 | Maeda et al. | 396/72 |
| 2007/0115382 A1* | 5/2007 | Fukuma et al. | 348/333.06 |
| 2007/0161416 A1* | 7/2007 | Sawayama et al. | 455/575.3 |

FOREIGN PATENT DOCUMENTS

| | | |
|---|---|---|
| JP | 2003-110675 | 4/2003 |
| JP | 2004253897 A | 9/2004 |
| JP | 2005-341126 | 12/2005 |

OTHER PUBLICATIONS

Office Action issued Dec. 19, 2008 in Chinese Application No. 2007101010299.

* cited by examiner

FIG. 2A

| PRESET FUNCTION MODE / INPUT Key | Photo record/play | | Movie record/play | | PC camera | | Settings | | MP3 | | Voice Record | | Mass Storage | | Pict Bridge | | DMB | |
|---|---|---|---|---|---|---|---|---|---|---|---|---|---|---|---|---|---|---|
| | Slide open | Slide close | Slide open | Slide close | Slide open | Slide close | Slide open | Slide close | Slide open | Slide close | Slide open | Slide close | Slide open | Slide close | Slide open | Slide close | Slide open | Slide close |
| Power Switch | Photo | Photo | Movie | Movie | PC-Cam | PC-Cam | Settings | Settings | MP3 | MP3 | Voice Rec | Voice Rec | Mass | Mass | Pict-Bridge | Pict-Bridge | DMB | DMB |
| Slide Open | — | Photo | — | Movie | — | PC-Cam | — | Settings | — | MP3 | — | Voice Rec | — | Mass | — | Pict-Bridge | — | DMB |
| Slide close | POWER off & Slide close | — | POWER off & Slide close | — | POWER off & Slide close | — | POWER off & Slide close | — | POWER off & Slide close | — | POWER off & Slide close | — | POWER off & Slide close | — | POWER off & Slide close | — | POWER off & Slide close | — |

← CAMERA MODES →  ← NON-CAMERA MODES →

FIG. 2B

| PRESET FUNCTION MODE / INPUT Key | Photo record | | Movie record | | PC camera | | Photo/Movie Play | | Settings | | MP3/Voice | | Mass Storage | | Pict Bridge | | DMB | |
|---|---|---|---|---|---|---|---|---|---|---|---|---|---|---|---|---|---|---|
| | Slide open | Slide close | Slide open | Slide close | Slide open | Slide close | Slide open | Slide close | Slide open | Slide close | Slide open | Slide close | Slide open | Slide close | Slide open | Slide close | Slide open | Slide close |
| Power Switch | Power off | Power off | Power off | Power off | Power off | Power off | Power off | Power off | Power off | Power off | Power off | Power off | Power off | Power off | Power off | Power off | Power off | Power off |
| Slide Open | — | Photo record | — | Movie record | — | PC-Cam | — | Photo/Movie Play | — | Settings | — | MP3/Voice Play | — | Mass | — | Pict Bridge | — | DMB |
| Slide close | Power off | — | Power off | — | Power off | — | Photo/Movie Play | — | Settings | — | MP3/Voice Play | — | Mass | — | Pict Bridge | — | DMB | — |

← CAMERA MODES →  ← NON-CAMERA MODES →

FIG. 5A

| | Photo | | | | | PictBridge(DPOF) | |
|---|---|---|---|---|---|---|---|
| | Capture Mode | | Play Mode | | | Play Mode | |
| | Slide Open | Slide Close | Slide Open | Slide Close | | Slide Open/Close | Full View |
| | | | Full/Thumbnail | Full View | Thumbnail | | |
| Hot key 1 | RECORD→PLAY | RECORD→PLAY | RECORD→PLAY | RECORD→PLAY | RECORD→PLAY | | |
| Hot key 2 | Flash | – | Slide Show | Slide Show | Slide Show | Print | |
| Hot key 3 | Macro | – | Protect | Protect | Protect | Data/Time | |
| Hot key 4 | Self Time | – | Delete | Delete | Delete | NUM(+) | NUM(–) |

FIG. 5B

| | Video | | | | |
|---|---|---|---|---|---|
| | Record Mode | | Play Mode | | |
| | Slide Open | Slide Close | Slide Open | Slide Close | |
| | | | Full/Thumbnail | Full View | Thumbnail |
| Hot key 1 | RECORD→PLAY | RECORD→PLAY | RECORD→PLAY | RECORD→PLAY | RECORD→PLAY |
| Hot key 2 | Program AE | – | All Play | All Play | All Play |
| Hot key 3 | White Balance | – | Protect | Protect | Protect |
| Hot key 4 | Self Timer | – | Delete | Delete | Delete |

FIG. 5C

Music

| | Play Mode | Slide Open | List Mode | | (Play) | (Delete) | (Protect) |
|---|---|---|---|---|---|---|---|
| | | | Slide Close | Slide Open | | | |
| Hot key 1 | Slide Open/Close | LIST→PLAY | LIST→PLAY | LIST→PLAY | LIST→PLAY | – | – |
| Hot key 2 | Play Mode | Play Mode | Play Mode | Play Mode | Play Mode | – | – |
| Hot key 3 | Hold | Hold | Hold | Hold | – | – | Protect |
| Hot key 4 | Equalizer | Equalizer | Delete | Delete | – | Delete | – |

FIG. 5D

| | Voice Rec. | | | DMB |
|---|---|---|---|---|
| | Record Mode | Slide Open | Play Mode / List Mode | Play Mode |
| | | | Slide Close | Slide Open/Close |
| Hot key 1 | Slide Open/Close | RECORD→PLAY | RECORD→PLAY | VIEW LIST |
| Hot key 2 | – | LIST→PLAY | LIST→PLAY | Favorite CH1 |
| Hot key 3 | – | Repeat | Repeat | Favorite CH2 |
| Hot key 4 | – | Delete | Delete | Favorite CH3 |

PORTABLE INTEGRATED DEVICE AND A METHOD OF CONTROLLING POWER THEREOF

CROSS-REFERENCE TO RELATED APPLICATIONS

This application claims priority under 35 U.S.C. §119(a) of Korean Patent Application No. 10-2006-0089097, filed in the Korean Intellectual Property Office on Sep. 14, 2006, the disclosure of which is hereby in its entirety incorporated by reference.

BACKGROUND OF THE INVENTION

1. Field of the Invention

The present general inventive concept relates to a portable integrated device and a method of controlling power thereof. More particularly, the present general inventive concept relates to a portable integrated device which selectively switches on or off according to the opening and closing of a slide, and a method of controlling power of the portable integrated device.

2. Description of the Related Art

Portable integrated devices are handheld devices having functions of camcorders, digital cameras, MP3 (MPEG layer 3) players, voice recorders, data storage devices, web cameras and the like. Portable integrated devices can be implemented by applying breakthrough digital technology to image processing devices such as camcorders.

Recently, portable integrated devices of a slide type have developed and become popular. In such slide type portable integrated devices, if a sliding part is pushed, a sensor mounted on a main body senses the opening of the sliding part so as to switch on a display on the portable integrated device, and if the sliding part is closed, power to the display is turned off.

In conventional portable integrated devices, if the sliding part is closed, power is turned off unconditionally, and thus camera functions are not available. In this state, functions provided from the portable integrated device such as music playback, voice recording, digital multimedia broadcast view or the like are not available.

SUMMARY OF THE INVENTION

The present general inventive concept is to provide a portable integrated device which determines an opening or closing of a slide, and controls power according to a function mode if the slide is closed, and a method of controlling the power thereof.

Additional aspects and advantages of the present general inventive concept will be set forth in part in the description which follows and, in part, will be obvious from the description, or may be learned by practice of the general inventive concept.

The foregoing and/or other aspects and utilities of the present general inventive concept may be achieved by providing a method of controlling power to a digital integrated device which includes a first body and a second body slidingly connected to each other, the method including a first mode and a second mode to slide the first body relative to the second body from an open position to a closed position, turning off power to the digital integrated device in the first mode, and maintaining the power to the digital integrated device in the second mode.

The first mode may be a mode in which a module provided on the first body is used, and the second mode may be a mode in which the module is not used.

The first mode may be a mode in which an image is captured using a camera, and the second mode may be a mode which an image is displayed or music is played.

The first mode may include a photo record mode, a movie record mode or a personal computer (PC) camcorder mode, and the second mode may include a photo play mode, a movie play mode, a MP3 mode, a voice record mode, a setting mode or a mass storage mode.

The foregoing and/or other aspects and utilities of the present general inventive concept may also be achieved by providing a method of controlling power to a digital integrated device which includes a first body and a second body slidingly connected to each other and includes a first mode and a second mode, the method including sliding the first body relative to the second body from a closed position to an open position, and switching a mode of the digital integrated device from the second mode to the first mode if the digital integrated device is in the second mode.

The first mode may be a mode in which an image is captured using a camera, and the second mode may be a mode in which an image is displayed or music is played.

The foregoing and/or other aspects and utilities of the present general inventive concept may also be achieved by providing a method of controlling power to a digital integrated device which includes a first body and a second body slidingly connected to each other and includes a first mode and a second mode, the method including sliding the first body relative to the second body from a closed position to an open position, determining whether the current mode is the first mode or the second mode, and displaying the first mode if the current mode is the first mode, and displaying the second mode if the current mode is the second mode.

The first mode may be a mode in which an image is captured using a camera, and the second mode may be a mode in which an image is displayed or music is played.

The foregoing and/or other aspects and utilities of the present general inventive concept may also be achieved by providing a portable integrated device including a sliding part which is movably connected to a main body, a module which is mounted on the main body and is used to operate in a first function mode, and a controller which controls a current mode to maintain a second function mode, if the module is made inoperable due to movement of the sliding part and the current mode is determined to be the second function mode, in which the module is not used.

The module may be made inoperable if the sliding part is located on an exposed surface of the module.

The module may be at least one of a lens, a speaker, a preset specified key, a joystick and a touch pad.

The first function mode may be a camera mode including at least one of a photo record mode, a movie record mode and a PC camcorder mode, and the second function mode may be a non-camera mode including at least one of a photo play mode, a movie play mode, a setting mode, a MP3 mode, a voice record mode, a mass storage mode, a photo printer mode and a digital multimedia broadcasting (DMB) display mode.

The controller may control operation of the second function mode using a hot key mounted on an outside of the main body, if the module mounted on the main body is made inoperable due to movement of the sliding part and the current mode is determined to be the second function mode in which the module is not used.

The foregoing and/or other aspects and utilities of the present general inventive concept may also be achieved by providing a method of controlling power, the method including determining a current mode, if a module used to operate in a first function mode is made inoperable due to movement of a sliding part which is movably connected to a main body including the module, and controlling the current mode to maintain a second function mode, if the current mode is determined to be the second function mode, in which the module is not used.

In the determining of the current mode, the module may be made inoperable if the sliding part is located on an exposed surface of the module.

The module may be at least one of a lens, a speaker, a preset specified key, a joystick and a touch pad.

The first function mode may be a camera mode including at least one of a photo record mode, a movie record mode and a PC camcorder mode, and the second function mode may be a non-camera mode including at least one of a photo play mode, a movie play mode, a setting mode, a MP3 mode, a voice record mode, a mass storage mode, a photo printer mode and a digital multimedia broadcasting (DMB) display mode.

In the controlling of the current mode, the controller may control operation of the second function mode using a hot key mounted on an outside of the main body, if the module mounted on the main body is made inoperable due to movement of the sliding part and the current mode is determined to be the second function mode in which the module is not used.

The foregoing and/or other aspects and utilities of the present general inventive concept may also be achieved by providing a computer readable medium to store a program to execute a method of controlling power to a digital integrated device which includes a first body and a second body slidingly connected to each other and includes a first mode and a second mode, the method including sliding the first body relative to the second body from a closed position to an open position, and switching a mode of the digital integrated device from the second mode to the first mode if the digital integrated device is in the second mode.

The foregoing and/or other aspects and utilities of the present general inventive concept may also be achieved by providing a method of controlling power of a portable integrated device, the method including slidingly providing a sliding part on a main body of the portable integrated device, and controlling a power supply of the portable integrated device based on a determination of an open or closed state of the sliding part and based on a function mode of the portable integrated device.

The foregoing and/or other aspects and utilities of the present general inventive concept may also be achieved by providing a computer readable medium to store a program to execute a method of controlling power of a portable integrated device, the method including slidingly providing a sliding part on a main body of the portable integrated device, and controlling a power supply of the portable integrated device based on a determination of an open or closed state of the sliding part and based on a function mode of the portable integrated device.

The foregoing and/or other aspects and utilities of the present general inventive concept may also be achieved by providing a portable integrated device, including a main body including a module operating in a plurality of function modes, a sliding part slidingly connected to the main body in open and closed states, a determination unit to determine whether the sliding part is in the open or closed state, and a controller to control a power supply of the portable integrated device based on the determination of the determination unit and to control operations corresponding to the plurality of function modes based on the function modes of the portable integrated device.

BRIEF DESCRIPTION OF THE DRAWINGS

These and/or other aspects and advantages of the general inventive concept will become apparent and more readily appreciated from the following description of the embodiments, taken in conjunction with the accompanying drawings of which:

FIG. 2A illustrates a method of controlling power supplied to a portable integrated device when a slide is open or closed in a state that the power is turned off and the slide is open or closed;

FIG. 2B illustrates a method of controlling power supplied to a portable integrated device when a slide is open or closed in a state that the power is turned on and the slide is open or closed;

FIGS. 5A-5D illustrate examples of a hot key preset according to function modes of a portable integrated device according to an exemplary embodiment of the present general inventive concept.

DETAILED DESCRIPTION OF THE PREFERRED EMBODIMENTS

Figure 1A:
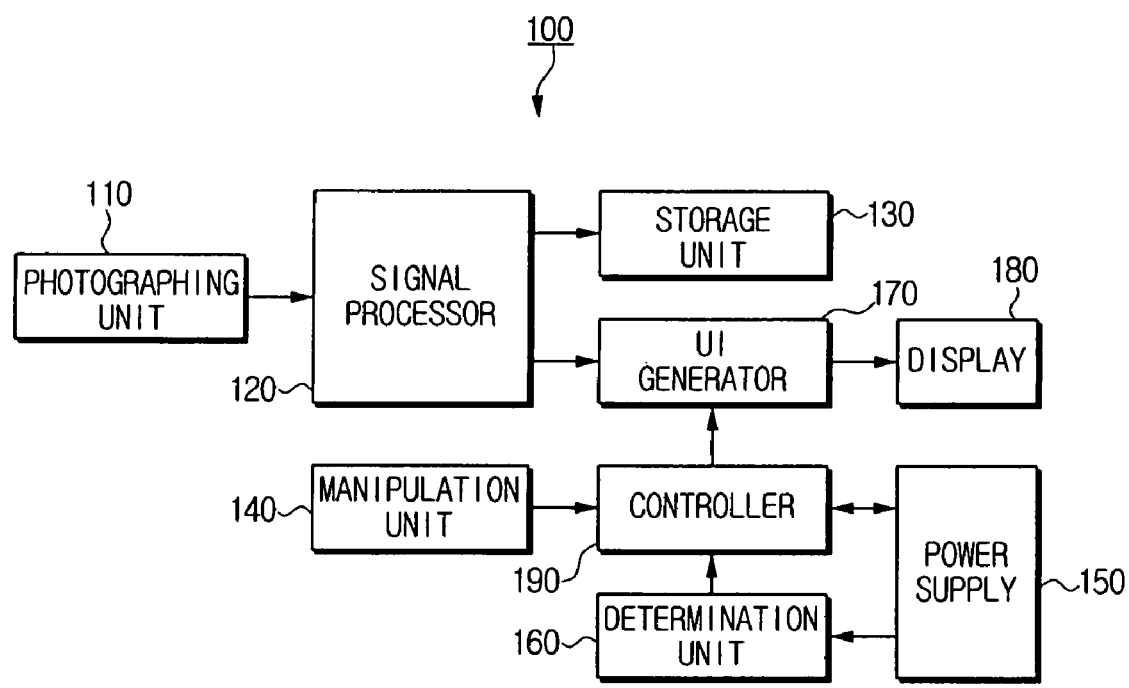
FIG. 1A is a block diagram illustrating a portable integrated device according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Hereinafter, certain exemplary embodiments of the present general inventive concept will be described in detail with reference to the accompanying drawing figures.

According to an exemplary embodiment of the present general inventive concept, a portable integrated device includes a main body 10 and a sliding part 20 which is slidingly connected to the main body 10. The main body comprises a lens 11 to capture an image of a subject and a display 180 to display a captured image and show input information. When the sliding part 20 is open, that is, when the sliding part 20 moves with respect to the main body 10 from a closed position to an open position, if an exposed surface of the lens 11 is not concealed by the sliding part 20, the lens 11 can be used. When the sliding part 20 is closed, if an exposed surface of the lens 11 is concealed by the sliding part 20, the lens 11 cannot be used. Although in the exemplary embodiment the lens 11 is mounted on the main body 10, it may be mounted on the sliding part 20, and the location of the lens is not limited to the main body 10.

Figure 1B:
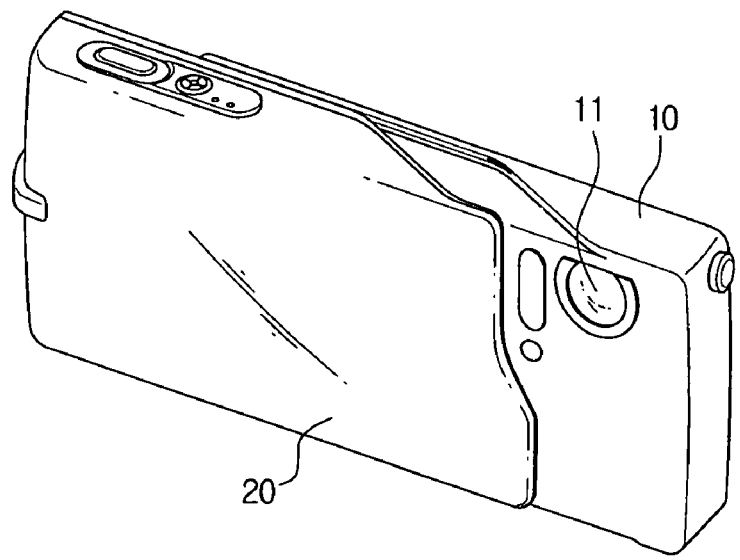
FIG. 1B is a front view schematically illustrating a configuration of a portable integrated device according to an exemplary embodiment of the present general inventive concept.
Figure 1C:
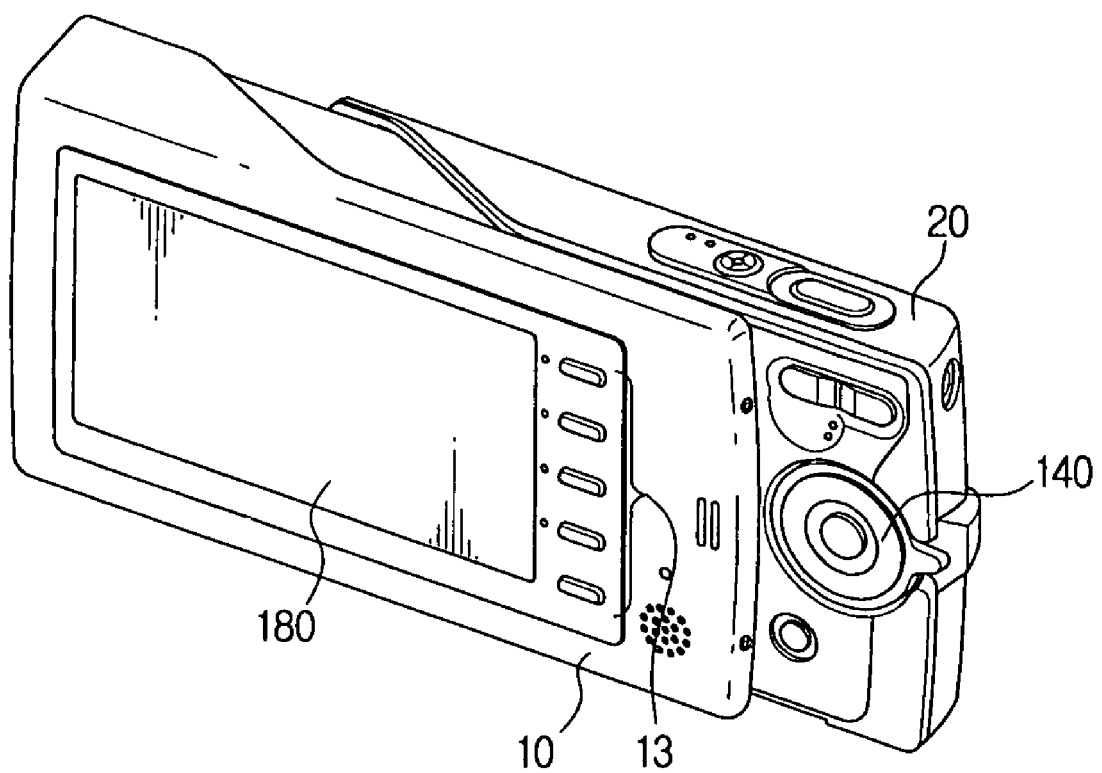
FIG. 1C is a rear view schematically illustrating a configuration of a portable integrated device according to an exemplary embodiment of the present general inventive concept.

FIG. 1A is a block diagram illustrating a portable integrated device according to an exemplary embodiment of the present general inventive concept, FIG. 1B is a front view schematically illustrating a configuration of a portable integrated device according to an exemplary embodiment of the present general inventive concept, and FIG. 1C is a rear view schematically illustrating a configuration of a portable integrated device according to an exemplary embodiment of the present general inventive concept.

Referring to FIGS. 1A-1C, the portable integrated device 100 includes a photographing unit 110, a signal processor 120, a storage unit 130, a manipulation unit 140, power supply 150, a determination unit 160, a user interface (UI) generator 170, a display 180 and a controller 190. The main body 10 may include hot keys 13.

The photographing unit 110 receives a light signal from a subject to be photographed through the lens 11, and converts the light signal into an electric signal.

The signal processor 120 performs processing of the electric signal received from the photographing unit 110, such as gain adjustment, noise removal, gamma correction, luminance signal separation and image signal compression.

The storage unit 130 stores various programs necessary to operation of the portable integrated device 100, and also stores image data received from the signal processor 120.

The manipulation unit 140 includes key buttons and a touch panel to receive instructions from a user and may be attached to the sliding part 20. Although the manipulation part 140 has been described as being attached to the sliding part 20, it may be attached to the main body 10, and the location of the manipulation part 140 is not limited to the sliding part 20.

The power supply 150 supplies power to operate the portable integrated device 100.

The determination unit 160 determines whether the power is supplied from the power supply 150 to the portable integrated device 100, and also determines whether the sliding part 20 is open or closed.

In greater detail, the determination unit 160 determines whether the sliding part 20 is open or closed using a sensor (not illustrated) mounted on the main body 10. That is, if the sliding part 20 is pushed open, the sensor senses this, or a switch is used when sliding the sliding part 20, so the determination unit 160 determines that the sliding part 20 is open. If the sliding part 20 is closed, the sensor senses this, so the determination unit 160 determines that the sliding part 20 is closed.

The UI generator 170 provides a way in which the portable integrated device 100 and a user can interact. The UI generator 170 generates and displays, for example, a Palo Alto Research Center Inc. (PARC) user interface (PUI) pertaining to user commands input in a physical manner through the manipulation unit 140, and a graphic user interface (GUI) pertaining to user commands input by selecting an icon or menu option displayed on the display 180. The PARC user interface embodies metaphors, a set of small pictures, or icons, arranged on a screen, similar to a virtual desktop. The icons may represent function modes such as camera and non-camera modes, playing/recording a movie/photo, etc. By using the manipulation part 140 to position a cursor over an icon and then clicking the manipulation button, a command may be instantly implemented, providing a simple and speedy process to select function modes and/or device functions.

The UI generator 170 displays a UI corresponding to each of the function modes of the portable integrated device 100.

The function modes are divided into the camera modes and non-camera modes. The camera modes may indicate modes using the lens mounted on the portable integrated device 100, such as a photo record mode, a movie record mode, and a personal computer (PC) camcorder mode. The non-camera modes may indicate modes not using the lens 11, such as a photo play mode, a movie play mode, a setting mode, an MP3 mode, a voice record mode, a mass storage mode, a PictBridge mode, and a digital multimedia broadcasting mode.

The controller 190 switches the power supplied to the portable integrated device 100 on and off based on the determination results of the determination unit 160, and controls operations corresponding to function modes based on the function modes of the portable integrated device 100.

More specifically, referring to FIG. 2A, when the power is turned off and the sliding part 20 is in a closed position, if the user opens the sliding part 20, the determination unit 160 determines that the sliding part 20 is open. Subsequently, the controller 190 operates the power supply 150 to supply power to the portable integrated device 100, and operates the UI generator 170 to display a function corresponding to a function mode preset in a setting mode on the display 180.

The function mode preset in the setting mode may be set by the user from among the function modes supported by the portable integrated device 100, or a function mode set prior to turning off the power of the portable integrated device 100. That is, for example, when a previous mode was a photo record mode, if the determination unit 160 determines that the sliding part 20 is open, the function mode of the portable integrated device 100 may still be set to photo record mode when the controller switches the portable integrated device 100 back on.

With reference to FIG. 2B, when the power is turned on and the sliding part 20 is in an open position, if a user closes the sliding part 20, the determination unit 160 determines that the sliding part 20 is closed. Subsequently, the controller 190 controls the power to the portable integrated device 100 according to a function mode of the portable integrated device 100.

That is, if the function mode of operation of the portable integrated device 100 is a camera mode, the controller 190 operates the power supply 150 to turn off the power, and if the function mode of operation of the portable integrated device 100 is a non-camera mode, the controller 190 operates the UI generator 170 to continue displaying a function corresponding to the function mode in operation on the display 180. Accordingly, in a state that the sliding part 20 is closed, the portable integrated device 100 can continue performing functions of the non-camera modes such as music playback, photo/movie playback, voice recording, and digital multimedia broadcast playback.

Additionally, when the power is turned on and the sliding part 20 is in a closed position, if the user opens the sliding part 20, the determination unit 160 determines that the sliding part 20 is open. Subsequently, the controller 190 operates the UI generator 170 to display a function corresponding to the function mode preset in the setting mode on the display 180.

Figure 3:
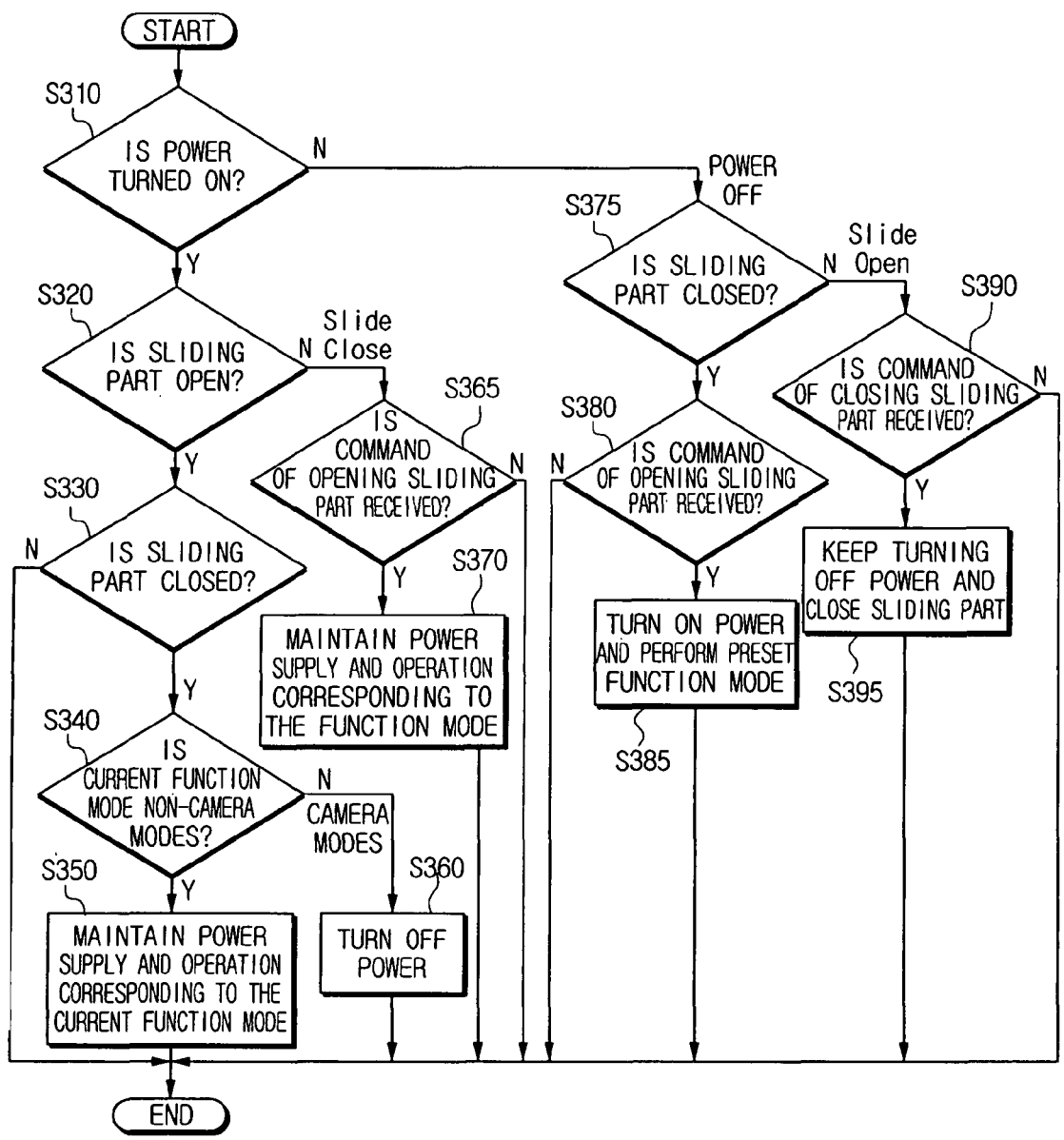
FIG. 3 is a flow chart illustrating a method of controlling power supplied to a portable integrated device of a slide type according to an exemplary embodiment of the present general inventive concept.

FIG. 3 is a flow chart illustrating a method of controlling power supplied to a portable integrated device of a slide type according to an exemplary embodiment of the present general inventive concept.

In FIG. 3, when the determination unit determines that the power is turned on in operation S310:Y and that the sliding part 20 is open in operation S320:Y, if the determination unit 160 determines that the user has closed the sliding part 20 in operation S330:Y, the controller 190 determines whether the function mode of the operation of the portable integrated device 100 is a non-camera mode in operation S340. The determination unit 160 determines whether the sliding part 20 is open or closed by sensing movement of the sliding part 20 using the sensor mounted on the main body 10 or by sensing use of the switch on the portable integrated device 100.

The function modes are divided into the camera modes and the non-camera modes. The camera modes indicate modes using the lens 11 mounted on the portable integrated device 100, including a photo record mode, a movie record mode, and a PC camcorder mode. The non-camera modes indicate modes not using the lens 11, including a photo play mode, a movie play mode, a setting mode, an MP3 mode, a voice record mode, a mass storage mode, a PictBridge mode, and a digital multimedia broadcasting playback mode.

Subsequently, if the determination unit determines that the function mode of the portable integrated device 100 is a non-camera mode in operation S340:Y, the controller 190 operates the power supply 150 to continue supplying power to the portable integrated device 100, and operates the UI generator 170 to continue displaying the function corresponding to the function mode in operation on the display 180 in operation S350. That is, the controller 190 operates the power supply 150 and the UI generator 170 to continue performing functions of the non-camera mode when the sliding part 20 has been closed.

Alternatively, if the determination unit 160 determines that the function mode of the portable integrated device 100 is a camera mode in operation S340:N, the controller 190 operates the power supply 150 to turn off the power to the portable integrated device 100 in operation S360.

In a state that the determination unit 160 determines that the sliding part 20 is closed in operation S320:N, if the determination unit 160 determines that a user has opened the sliding part 20 in operation S365:Y, the controller 190 operates the power supply 150 to continue supplying power to the portable integrated device 100, and operates the UI generator 170 to continue displaying a function corresponding to the function mode in operation on the display 180 in operation S370.

That is, the controller 190 operates the UI generator 170 to continue displaying the function corresponding to a function mode in use when the sliding part 20 is closed, on the display 180, even after the sliding part 20 has been opened.

Subsequently, in a state that power is turned off in operation S310:N and the sliding part 20 is closed in operation S375:Y, if the determination unit 160 determines that the sliding part 20 is open in operation S380:Y, the controller 190 operates the power supply 150 to continue supplying power to the portable integrated device 100, and operates the UI generator 170 to continue displaying the function corresponding to the function mode preset in the setting mode of the portable integrated device on the display 180 in operation S385.

The function mode preset in the setting mode may be set by the user from among the function modes supported by the portable integrated device 100, or the function mode in use prior to the power of the portable integrated device 100 being switched off.

Additionally, if the determination unit 160 determines that the sliding part 20 is open in operation S375:N, and if the determination unit 160 determines that the sliding part 20 is being closed, in operation S390:Y, the controller 190 operates the power supply 150 to turn off power to the portable integrated device 100 in the state that the sliding part 20 is closed, in operation S395.

A method of controlling the power of the portable integrated device 100 according to the function modes has been described with reference to FIGS. 1A-1C, 2A, 2B, and 3.

However, in a portable integrated device according to an exemplary embodiment of the present general inventive concept and a method of controlling power thereof, power may also be controlled according to the function modes of the portable integrated device by a power button (not illustrated) provided on the manipulation unit 140 or the portable integrated device 100.

Figure 4A:
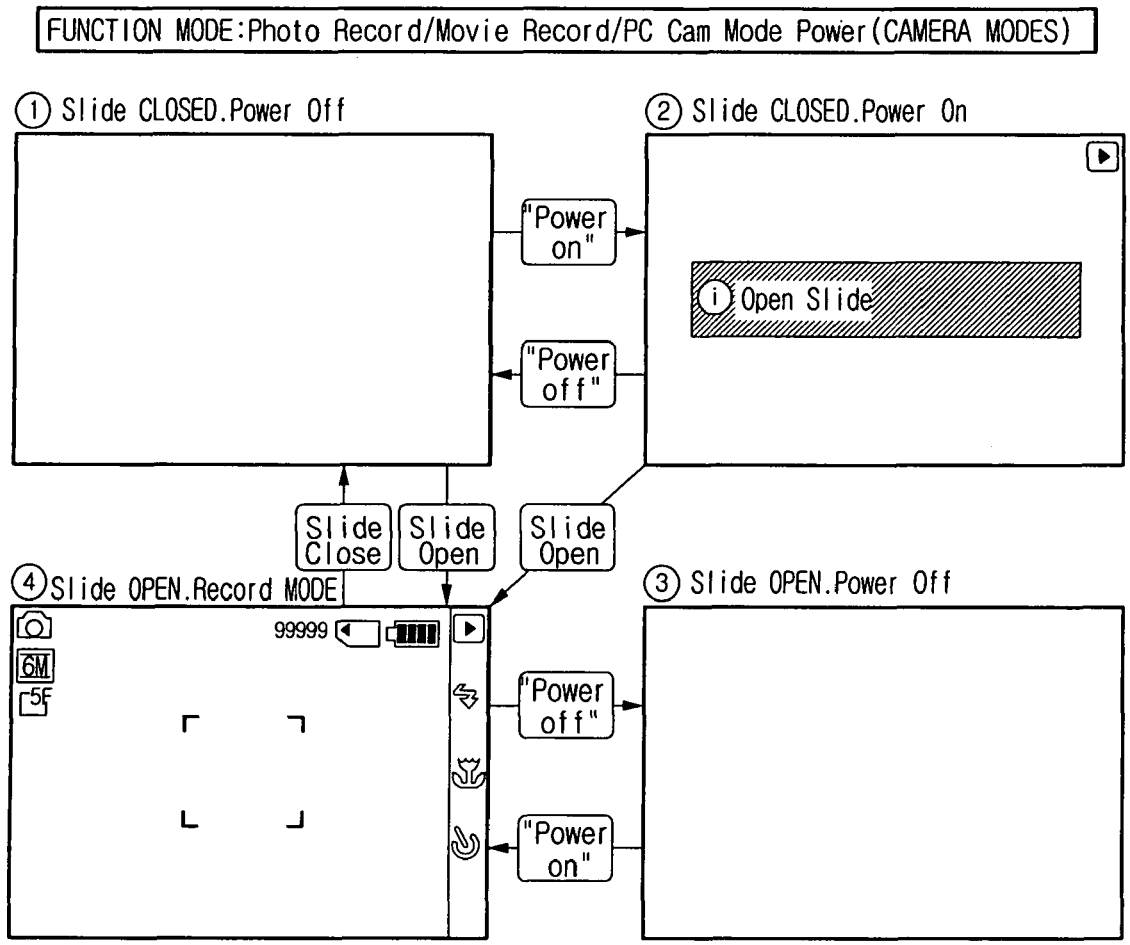
FIGS. 4A-4H schematically illustrate a method of controlling power according to function modes of FIG. 3.
Figure 4B:
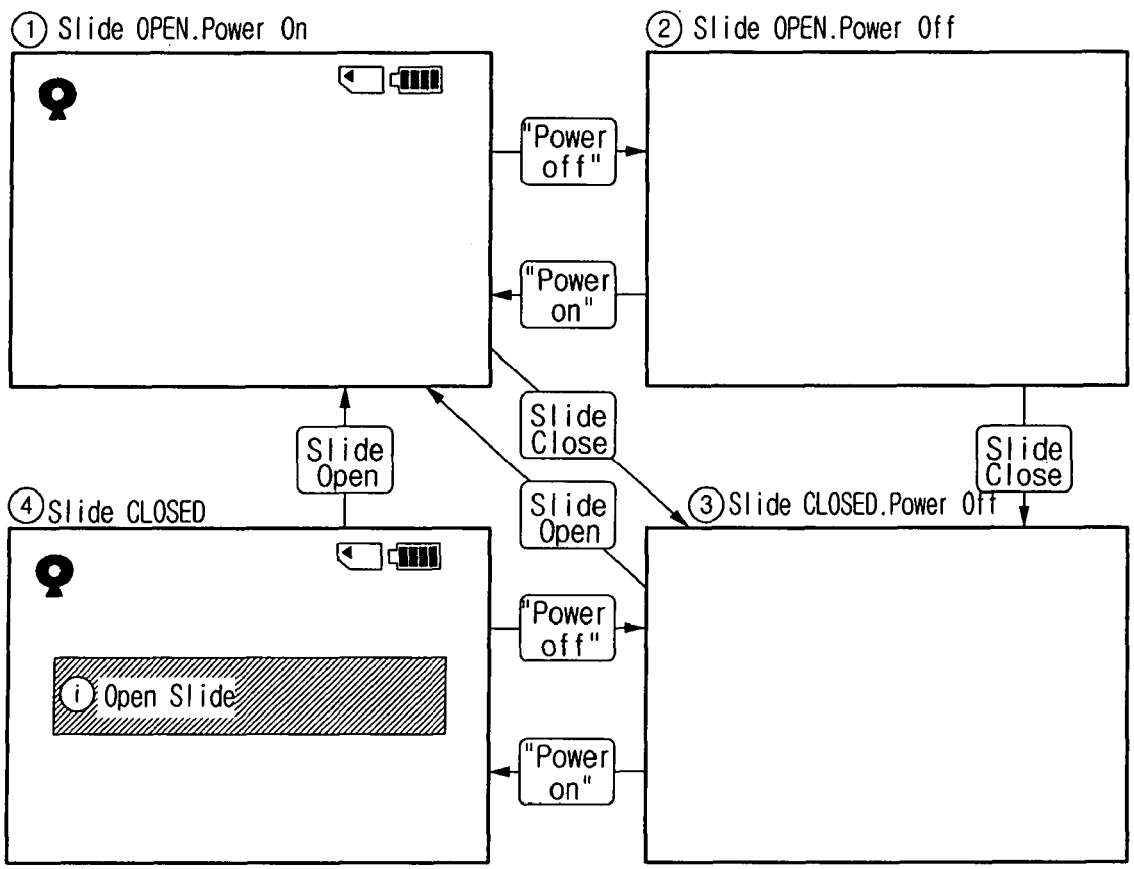

That is, with reference to FIGS. 4A and 4B, in a state that power to the portable integrated device 100 is turned off and the sliding part 20 is closed as illustrated in FIG. 4A, when the preset function mode is a camera modes, if the power button (not illustrated) provided on the manipulation unit 140 or the portable integrated device 100 is pressed, the controller 190 operates the power supply 150 to supply power to the portable integrated device 100, and operates the UI generator 170 to display the function corresponding to the preset function mode on the display 180. In this case, the controller 190 operates the UI generator 170 to display an alert message such as "open slide" on the display 180 if the function mode preset in a setting mode is a camera mode.

Subsequently, in a state that power to the portable integrated device 100 is turned on and the sliding part 20 is closed, if the user opens the sliding part 20 and the preset function mode is a non-camera mode, the controller 190 operates the power supply 150 to keep supplying power to the portable integrated device 100 and operates the UI generator 170 to display the function corresponding to the function mode preset in the setting mode on the display 180. That is, the UI generator 170 displays a message "open slide" on the display 180 when the sliding part 20 is closed, and then if the sliding part 20 is opened, a function corresponding to the preset function mode is displayed on the display 180.

Moreover, in the state that power to the portable integrated device 100 is turned on and the sliding part 20 is open as illustrated in FIG. 4B, if the power button (not illustrated) is pressed, the controller 190 operates the power supply 150 to turn off the power to the portable integrated device 100.

Figure 4C:
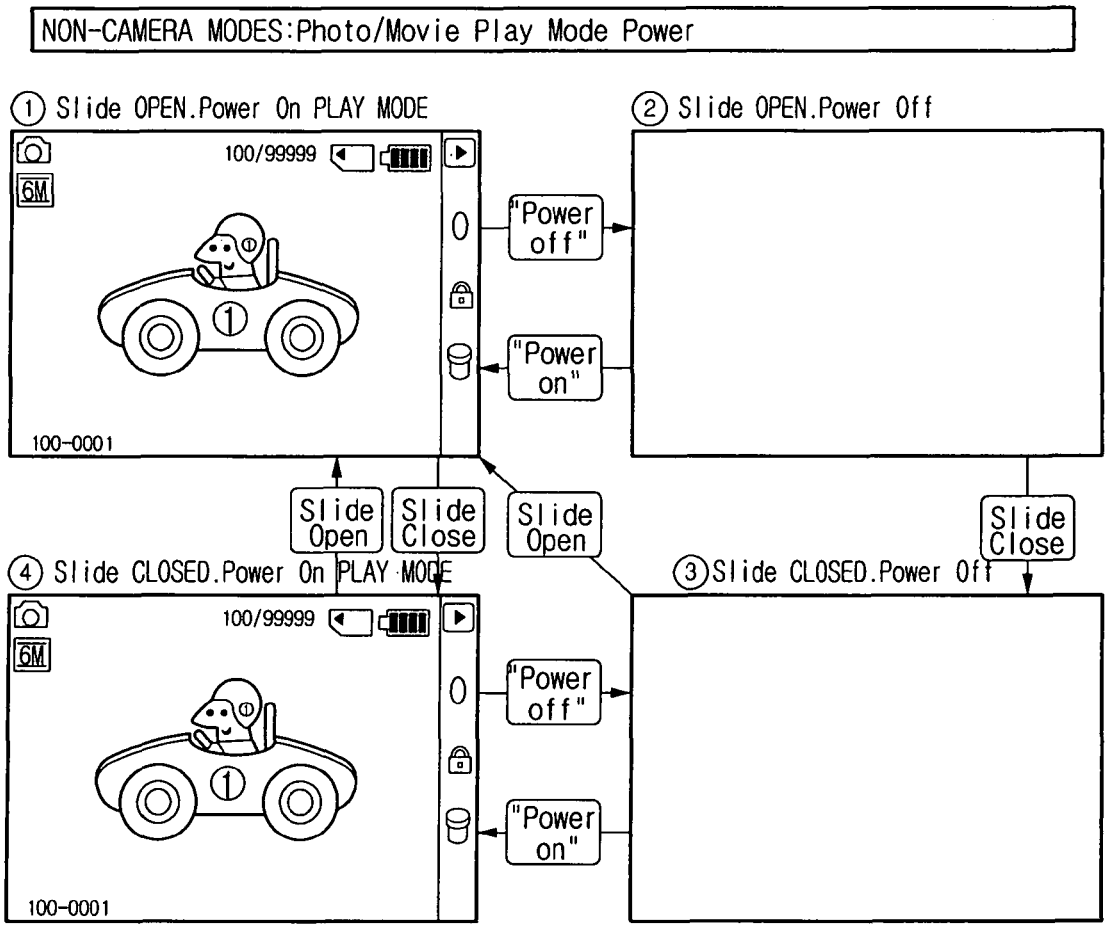
Figure 4D:
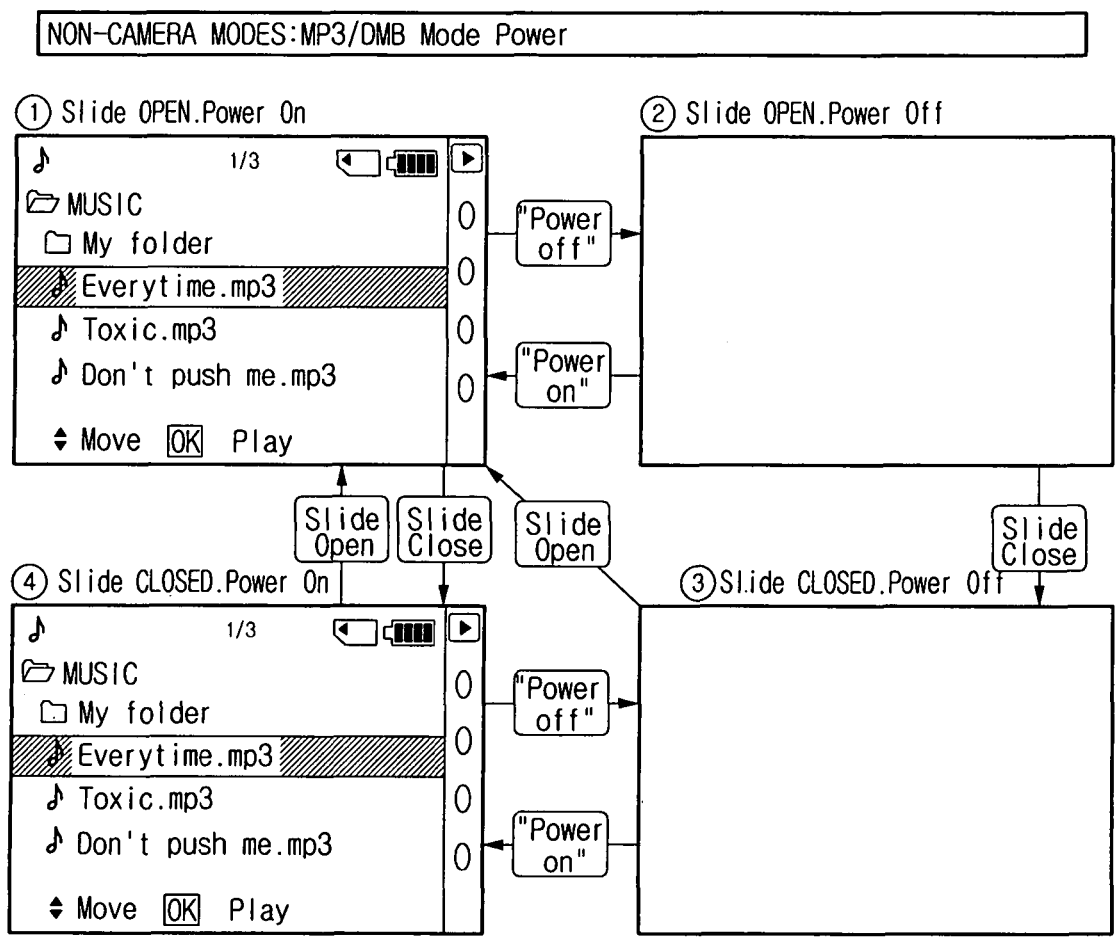
Figure 4E:
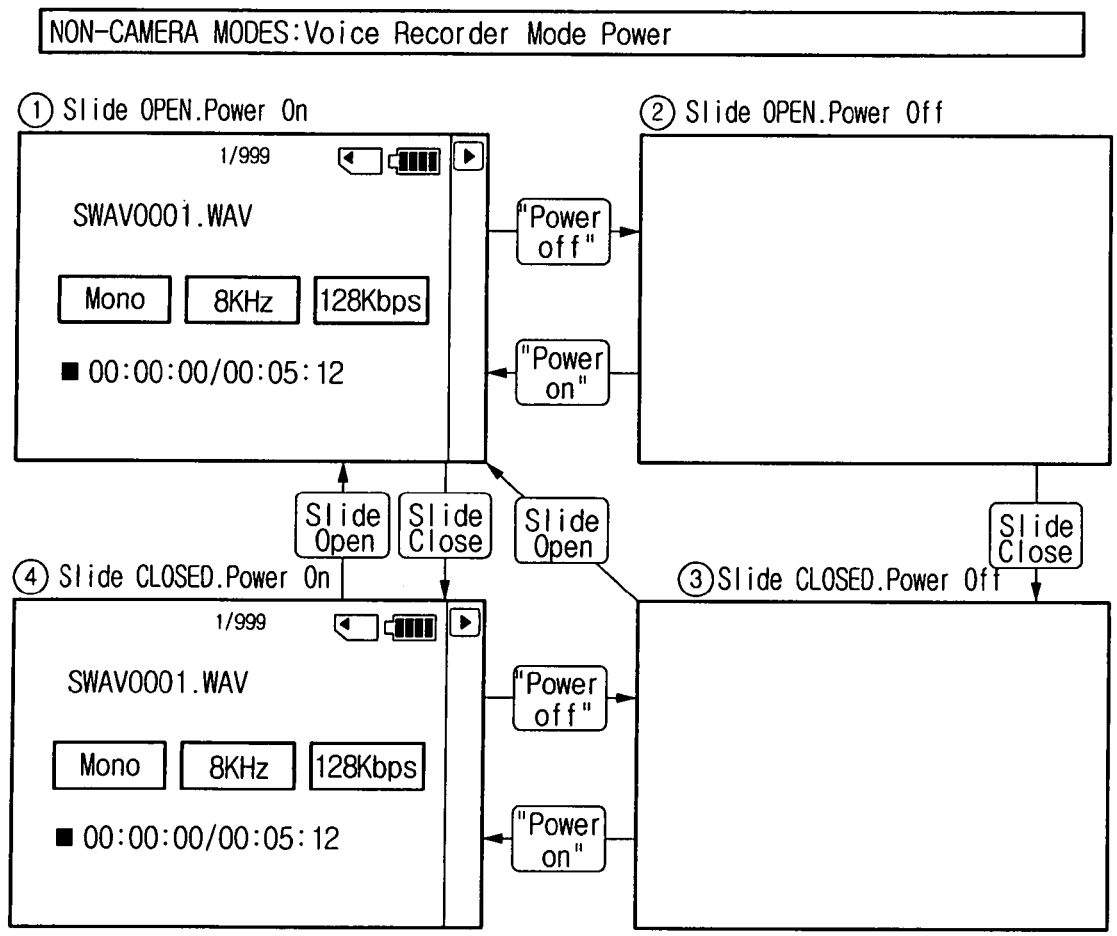
Figure 4F:
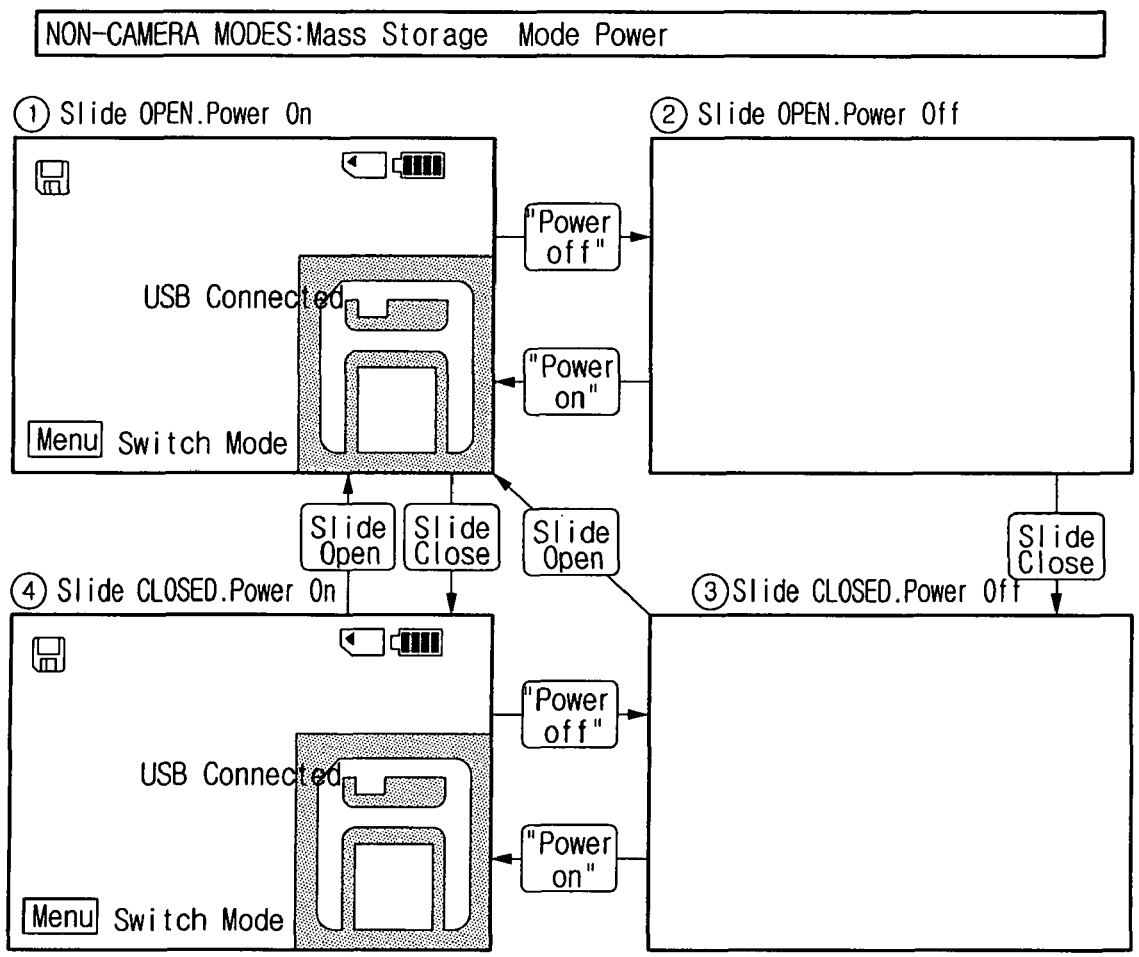
Figure 4G:
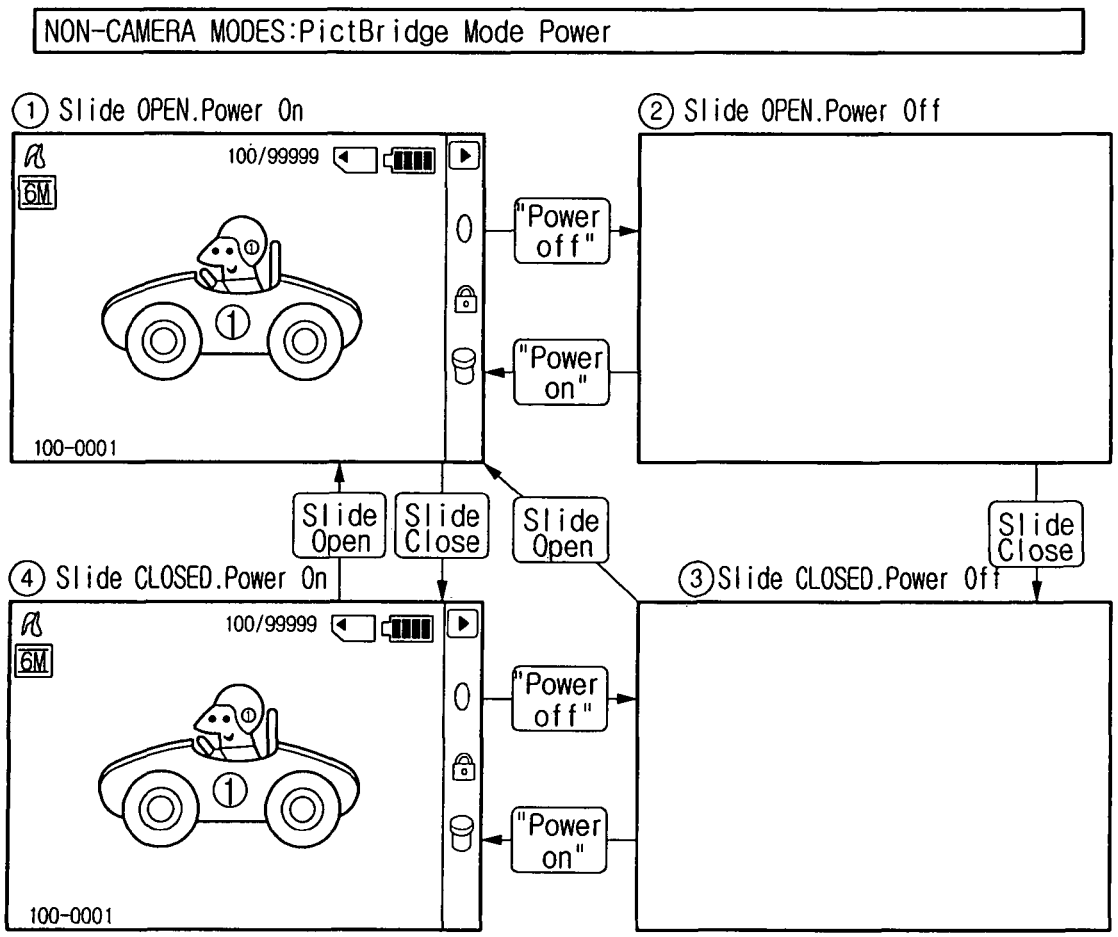
Figure 4H:
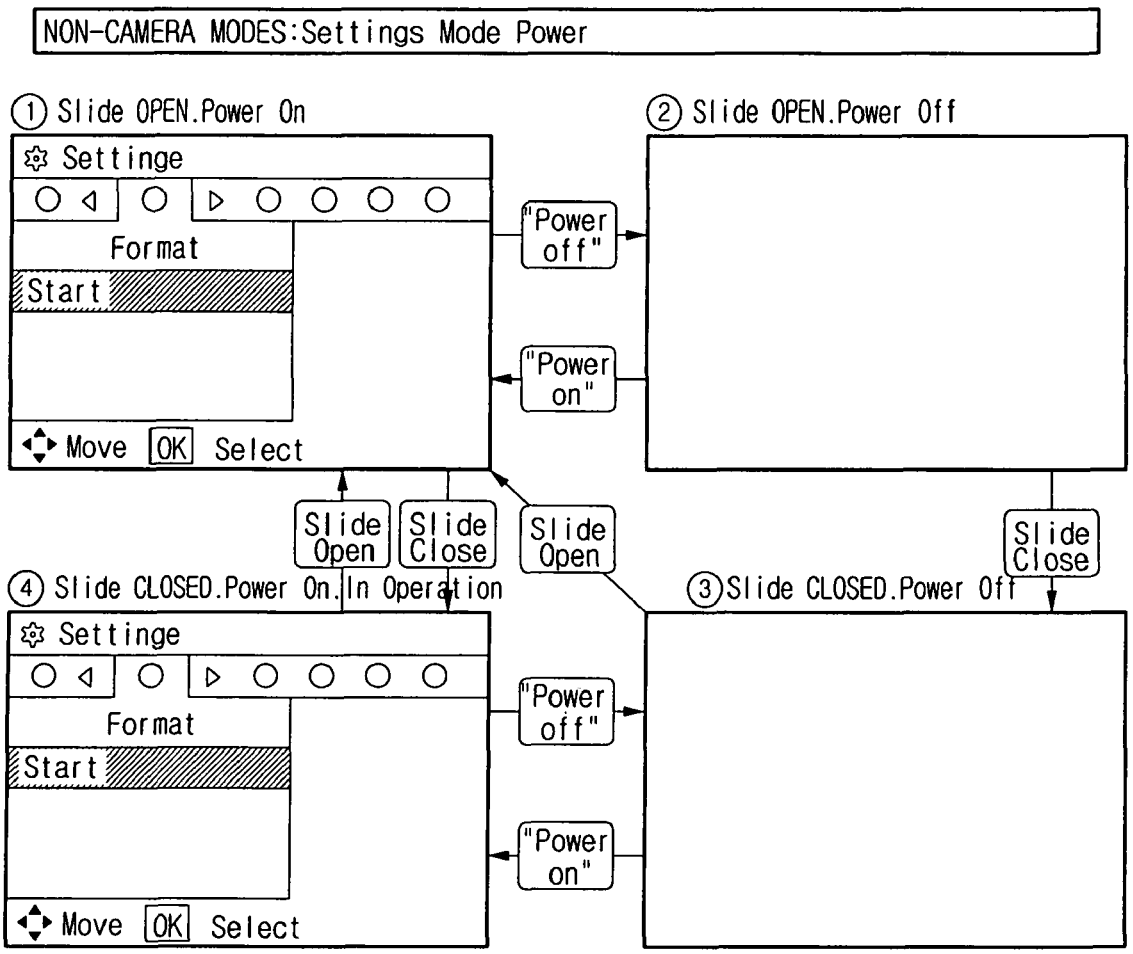

Meanwhile, in the state that power to the portable integrated device 100 is turned on and the sliding part 20 is open as illustrated in FIGS. 4C and 4H, when the preset function mode of operation is a non-camera mode, if the power button (not illustrated) is pressed, the controller 190 operates the power supply 150 to turn off the power to the portable integrated device 100.

Furthermore, in the state that power to the portable integrated device 100 is turned off and the sliding part 20 is closed, when the preset function mode of operation is a non-camera mode, if the power button (not illustrated) is pressed, the controller 190 operates the power supply 150 to supply power to the portable integrated device 100 and operates the UI generator 170 to display the function corresponding to the function mode preset in the setting mode on the display 180.

In Addition, in a portable integrated device according to an exemplary embodiment of the present general inventive concept and a method of controlling the power thereof, a hot key 13 provided on the main body may control the function corresponding to the function mode in operation when the sliding part 20 is closed.

The hot key 13 may be preset differently in each of the function modes, and examples of the hot key 13 according to each of the function modes are illustrated in FIGS. 5A-5D.

In FIG. 5A, in a state that the preset function mode is a photo record mode, while the power is turned off and the sliding part 20 is closed, if a user opens the sliding part 20 or presses the power button, the photo record mode may be switched to a photo play mode using a first hot key. That is, if a first hot key is pressed, the controller 190 can control a current function mode of the portable integrated device 100 from a photo record mode to a photo play mode. In FIGS. 5B and 5C, the hot key 13 is operated in the same manner as illustrated in FIG. 5A, thus a detailed description is omitted.

As illustrated in FIG. 5C, if a third hot key is pressed down for a preset duration, the portable integrated device 100 enters a "hold" state, so it is impossible to switch a mode using the hot key 13 or the manipulation unit 140. The "hold" state may be a function of preventing cutoff of music playback by pressing buttons while playing music.

In a portable integrated device according to an exemplary embodiment of the present general inventive concept and a method of controlling the power thereof, function modes are divided into camera modes and non-camera modes based on the lens provided on the main body and power is controlled according to the function modes, but the method of controlling the power is not limited hereto. The function modes may be divided into a first function mode and a second function mode based on a module provided on the main body. The first function mode and the second function mode are determined according to whether or not the module is used, and the module may be a speaker, a preset key such as a direction key, a joystick, or a touch pad instead of the lens.

For example, if a speaker is used as the module, the function modes are divided into a first function mode using the speaker and a second function mode not using the speaker. The first function mode is operable regardless of whether or not the speaker is exposed externally, and the second function mode is operable only when the speaker is exposed externally.

Furthermore, in a portable integrated device according to an exemplary embodiment of the present general inventive concept and a method of controlling the power thereof, the lens used as a module is limited to be provided on the main body, but it is not limited hereto. The module may be provided on the sliding part.

Moreover, in a portable integrated device according to an exemplary embodiment of the present general inventive concept and a method of controlling the power thereof, the portable integrated device is divided into a main body and a sliding part, but it is not limited hereto. The portable integrated device may include a first body and a second body, and the first body and the second body may be applicable to a slidable device.

As can be appreciated from the above description, power control may be performed differently according to whether the sliding part is open or closed and whether the preset function mode of the portable integrated device is a camera mode or a non-camera mode, so that functions of the non-camera mode can be maintained even when the sliding part is closed.

The present general inventive concept can be embodied as computer-readable codes on a computer-readable recording medium. The computer-readable recording medium is any data storage device that can store data which can be thereafter read by a computer system. Examples of the computer-readable recording media include read-only memory (ROM), random-access memory (RAM), CD-ROMs, magnetic tapes, floppy disks, optical data storage devices, and carrier waves (such as data transmission through the Internet). The computer-readable recording medium can also be distributed over network-coupled computer systems so that the computer-readable code is stored and executed in a distributed fashion. Also, functional programs, codes, and code segments to accomplish the present general inventive concept can be easily construed by programmers skilled in the art to which the present general inventive concept pertains. The method illustrated in FIGS. 2A, 2B, 3, and 4A-4H can be stored in the computer-recorded medium in a form of computer-readable codes to perform the method when the computer reads the computer-readable codes of the recording medium.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of controlling power to a digital integrated device which has a first body and a second body slidingly connected to each other and a first mode and a second mode, the method comprising:
    sliding the first body relative to the second body from an open position to a closed position; and
    managing power to the digital integrated device based upon the closed position, such that, if the digital integrated device is in the first mode, the digital integrated device is turned off, and, if the digital integrated device is in the second mode, power is maintained to the digital integrated device.

2. The method of claim 1, wherein the first mode is a mode in which a module provided on the first body is used, and the second mode is a mode in which the module is not used.

3. The method of claim 1, wherein the first mode is a mode in which an image is captured using a camera, and the second mode is a mode in which an image is displayed or music is played.

4. The method of claim 1, wherein the first mode comprises a photo record mode, a movie record mode or a personal computer (PC) camcorder mode, and the second mode comprises a photo play mode, a movie play mode, a MP3 mode, a voice record mode, a setting mode or a mass storage mode.

5. A method of controlling power to a digital integrated device which has a first body and a second body slidingly connected to each other and a first mode and a second mode, the method comprising:
    sliding the first body relative to the second body from a closed position to an open position;
    switching a mode of the digital integrated device from the second mode to the first mode if the digital integrated device is in the second mode; and
    managing power to the digital integrated device according to the first mode or the second mode, such that, if the digital integrated device is initially in the first mode, the digital integrated device is turned on, and, if the digital integrated device is initially in the second mode, power is maintained to the digital integrated device.

6. The method of claim 5, wherein the first mode is a mode in which an image is captured using a camera, and the second mode is a mode in which an image is displayed or music is played.

7. A method of controlling power to an image recording device which has a first body and a second body slidingly connected to each other and a first mode and a second mode, the method comprising:
    sliding the first body relative to the second body from a closed position to an open position;
    determining whether a current mode is the first mode or the second mode;
    displaying the first mode if the current mode is the first mode and displaying the second mode if the current mode is the second mode; and
    managing power to the image recording device according to the first mode or the second mode, such that, if the image recording device is initially in the first mode, the image recording device is turned on, and, if the image recording device is initially in the second mode, power is maintained to the image recording device.

8. The method of claim 7, wherein the first mode is a mode in which an image is captured using a camera, and the second mode is a mode in which an image is displayed or music is played.

9. A portable integrated device, comprising:
a sliding part which is movably connected to a main body;
a module which is mounted on the main body and is used to operate in a first function mode; and
a controller which controls a current mode to maintain a second function mode, if the module is made inoperable due to movement of the sliding part and the current mode is determined to be the second function mode, in which the module is not used, and which controls a current mode to maintain a first function mode and to turn the portable integrate device off, if the module is made inoperable due to movement of the sliding part and the current mode is determined to be the first function mode, in which the module is used.

10. The device of claim 9, wherein the module is made inoperable if the sliding part is located on an exposed surface of the module.

11. The device of claim 9, wherein the module is at least one of a lens, a speaker, a preset specified key, a joystick and a touch pad.

12. The device of claim 9, wherein the first function mode is a camera mode comprising at least one of a photo record mode, a movie record mode and a PC camcorder mode, and the second function mode is a non-camera mode comprising at least one of a photo play mode, a movie play mode, a setting mode, a MP3 mode, a voice record mode, a mass storage mode, a photo printer mode and a digital multimedia broadcasting (DMB) display mode.

13. The device of claim 9, wherein the controller controls operation of the second function mode using a hot key mounted on an outside of the main body, if the module mounted on the main body is made inoperable due to movement of the sliding part and the current mode is determined to be the second function mode in which the module is not used.

14. A method of controlling power to a digital integrated device, the method comprising:
determining a current mode if a module used to operate in a first function mode is made inoperable due to movement of a sliding part which is movably connected to a main body comprising the module; and
controlling the current mode to maintain a second function mode, if the current mode is determined to be the second function mode in which the module is not used, and controlling the current mode to maintain a first function mode and to turn the portable integrated device off, if the module is made inoperable due to movement of the sliding part and the current mode is determined to be the first function mode.

15. The method of claim 14, wherein in the determining of the current mode, the module has been made inoperable due to the sliding part being located on an exposed surface of the module.

16. The method of claim 14, wherein the module is at least one of a lens, a speaker, a preset specified key, a joystick and a touch pad.

17. The method of claim 14, wherein the first function mode is a camera mode comprising at least one of a photo record mode, a movie record mode and a PC camcorder mode, and the second function mode is a non-camera mode comprising at least one of a photo play mode, a movie play mode, a setting mode, a MP3 mode, a voice record mode, a mass storage mode, a photo printer mode and a digital multimedia broadcasting (DMB) display mode.

18. The method of claim 14, wherein in the controlling of the current mode, the controller controls operation of the second function mode using a hot key mounted on an outside of the main body, if the module mounted on the main body is made inoperable due to movement of the sliding part and the current mode is determined to be the second function mode in which the module is not used.

19. A non-transitory computer readable medium to store a computer program to execute a method of controlling power to a digital integrated device which comprises a first body and a second body slidingly connected to each other and comprises a first mode and a second mode, the method comprising:
sliding the first body relative to the second body from a closed position to an open position; and
switching a mode of the digital integrated device from the second mode to the first mode if the digital integrated device is in the second mode and managing power in the first mode and the second mode, such that, if the digital integrated device is initially in the first mode, the digital integrated device is turned on, and, if the digital integrated device is initially in the second mode, power is maintained to the digital integrated device.

20. A method of controlling power of a portable integrated device, the method comprising:
slidingly providing a sliding part on a main body of the portable integrated device; and
controlling a power supply of the portable integrated device based on a determination of an open or closed state of the sliding part and based on a function mode of the portable integrated device,
wherein controlling the power supply of the portable integrated device consists of maintaining power to the portable integrated device, if the function mode is determined to be a second function mode, and turning power off to the portable integrated device, if the function mode is determined to be a first function mode and the sliding part is determined to be in a closed state.

21. The method claim 20, wherein the function mode comprises a camera mode or a non-camera mode.

22. A non-transitory computer readable medium to store a computer program to execute a method of controlling power to a portable integrated device, the method comprising:
slidingly providing a sliding part on a main body of the portable integrated device; and
controlling a power supply of the portable integrated device based on a determination of an open or closed state of the sliding part and based on a function mode of the portable integrated device,
wherein controlling the power supply of the portable integrated device consists of maintaining power to the portable integrated device, if the function mode is determined to be a second function mode, and turning power off to the portable integrated device, if the function mode is determined to be a first function mode and the sliding part is determined to be in a closed state.

23. An image recording device, comprising:
a main body comprising:
a module operating in a plurality of function modes;
a sliding part slidingly connected to the main body in open and closed states;
a determination unit to determine whether the sliding part is in the open or closed state; and a controller to control a power supply of the portable integrated device based on the determination of the determination unit and to control operations corresponding to the plurality of function modes based on the function modes of the portable integrated device, wherein the controller maintains power to the portable integrated device, if the function mode is determined to be a second function mode, and turns power off to the portable integrated device, if the function mode is determined to be a first function mode and the sliding part is determined to be in a closed state.

24. The device of claim 23, wherein the determination unit determines the sliding part is in the open state when the power supply is turned off and the sliding part is in the closed position if a user opens the sliding part.

25. The device of claim 23, wherein the plurality of function modes comprise a preset function mode set by a user before the power supply is turned off.

26. The device of claim 23, wherein the plurality of function modes comprise a plurality of camera modes and a plurality of non-camera modes.

27. The device of claim 25, wherein the controller reestablishes the preset function mode when the power supply is turned back on.

28. The device of claim 23, wherein the determination unit further comprises a sensor to sense the open and closed states.

29. The device of claim 23, further comprising:
a graphical user interface to display a user interface corresponding to each of the plurality of function modes of the device.

30. The device of claim 29, wherein the graphical user interface comprises a Palo Alto Research Center (PARC) user interface.

31. An image recording device, comprising:
a main body having a module which is mounted on the main body and is used to operate in a first function mode;
a sliding part which is movably connected to the main body to perform a second function mode; and a controller which controls a current mode to maintain the second function mode, if the module is made inoperable due to movement of the sliding part and the current mode is determined to be the second function mode, in which the module is not used, and which controls a current mode to maintain a first function mode and to turn the portable integrate device off, if the module is made inoperable due to movement of the sliding part and the current mode is determined to be the first function mode, in which the module is used, wherein the first function mode is a mode in which an image is captured using a camera, and the second function mode is a mode in which an image is displayed or music is played.

32. An image recording device, comprising:
a main body having a module which is mounted on the main body and is used to operate in a first function mode;
a sliding part which is movably connected to the main body, the sliding part and main body substantially similarly sized; and
a controller which controls a current mode to maintain a second function mode and maintain power to the image recording device, if the module is made inoperable due to movement of the sliding part and the current mode is determined to be the second function mode, in which the module is not used, and which controls a current mode to maintain the first function mode and to turn the image recording device off, if the module is made inoperable due to movement of the sliding part and the current mode is determined to be the first function mode, in which the module is used.

33. The image recording device of claim 32, wherein the first function mode comprises a photo record mode, a movie record mode or a personal computer (PC) camcorder mode, and the second function mode comprises a photo play mode, a movie play mode, a MP3 mode, a setting mode or a mass storage mode.

* * * * *